United States Patent [19]

Martin

[11] Patent Number: 4,748,765
[45] Date of Patent: Jun. 7, 1988

[54] LIVEWELL APPARATUS AND METHOD

[76] Inventor: Dennis K. Martin, 2221 Franklin St., Rock Hill, S.C. 29730

[21] Appl. No.: 887,887

[22] Filed: Jul. 18, 1986

[51] Int. Cl.⁴ ........................................... A01K 97/00
[52] U.S. Cl. ..................................................... 43/55
[58] Field of Search .................... 43/55, 56, 57; 119/3, 119/5; 114/255

[56] References Cited

U.S. PATENT DOCUMENTS

| | | | |
|---|---|---|---|
| 1,991,149 | 2/1935 | Haislip | 119/5 |
| 2,151,225 | 3/1939 | Newton | 43/55 |
| 2,594,474 | 4/1952 | McGrath | 119/3 |
| 3,717,123 | 2/1973 | Regnier | 119/3 |
| 4,033,280 | 7/1977 | Wood | 43/57 |
| 4,074,651 | 2/1978 | Arduser | 114/255 |
| 4,151,810 | 5/1979 | Wiggins | 119/5 |
| 4,168,590 | 9/1979 | Beshoner | 43/55 |
| 4,182,267 | 1/1980 | Kominami | 119/3 |

Primary Examiner—Gene P. Crosby
Attorney, Agent, or Firm—Shefte, Pinckney & Sawyer

[57] ABSTRACT

An improved livewell apparatus and method of operation thereof for use in recreational fishing boats and like watercraft wherein water from the livewell is withdrawn, conveyed through a heat exchange conduit in an auxiliary ice chest or other heat exchange arrangement, and returned to the livewell tank through an aeration spray head. The water in the livewell tank is cooled in this manner to a temperature sufficiently reduced from the natural aquatic habitat of captured gamefish to induce a state of slowed metabolism of the gamefish and, in turn, to prolong their captive life in comparison with conventional livewells.

30 Claims, 2 Drawing Sheets

LIVEWELL APPARATUS AND METHOD

BACKGROUND OF THE INVENTION

The present invention relates generally to apparatus and methods for the temporary captive storage of live gamefish and other similar aquatic animals. More particularly, the present invention relates to an improved livewell apparatus and method for use in a recreational fishing boat and similar watercraft.

Over recent years, recreational and sport fishing has grown considerably in popularity as well as sophistication with the advent of more scientifically-designed fishing equipment and techniques. As part of this trend, various technical and design improvements in recreational fishing boats have evolved, one such improvement being the provision of an inboard water reservoir or tank, commonly referred to as a "livewell," for containing a quantity of water in which to store captured fish to maintain them alive for a reasonable period of time in captivity. With the proliferation in past years of tournament fishing events with relatively sizable monetary awards to winning participants, the provision and reliability of a livewell in a fishing boat is of considerable importance to the serious fisherman in that typical tournament fishing rules provide for some penalization as to dead fish and, moreover, a fish normally loses several ounces of weight upon its death as a result of the natural emptying of the fish's waste cavities, scale loss and similar reasons.

Conventional livewells provided in modern recreational fishing boats typically provide a battery-operated electric water pump for selectively filling the tank with water from the ambient body of water in which the boat is being operated and an overflow discharge line to establish a maximum level of water in the tank to prevent overfilling thereof. More sophisticated livewells also provide a pump-operated aeration system for withdrawing water contained in the tank and spraying it in return into the tank to replenish any oxygen from the water consumed by fish stored therein. An electric timing device may be provided to periodically actuate and de-actuate the aeration system. In addition, it is normally necessary in practice to periodically operate the fill pump for the tank to discharge through the overflow line fish scales, slime secretions and waste discharges which captured fish typically expel in their normally excited state after being placed in the livewell. a timing device may therefore also be provided in conjunction with the livewell fill pump to automatically perform this overflow dischage periodically.

Despite the above-described provisions in the most sophisticated conventional livewells for maintaining a relatively clean body of contained water in the livewell and for continuously aerating the water, experience has shown that even the most sophisticated livewells are incapable of reliably maintaining captured fish alive for more than one to three hours. The severity of this problem can be affected by numerous factors, including the particular species of fish involved, the condition and excited nature of the fish, the condition of the water utilized in the livewell including for instance its oxygen content and temperature, etc., all of which make it difficult to evaluate and determine the reason or reasons for this problem.

SUMMARY OF THE INVENTION

Accordingly, it is a principal object of the present invention to provide an improved livewell apparatus and method capable of reliably maintaining captured fish alive for relatively extended temporary periods of time, such as up to twelve to sixteen hours covering an extended day's fishing trip.

It is theorized that one of the principal causes of problems in maintaining captured fish alive is the excited nature of the fish when placed in a generally enclosed livewell or similar tank. As mentioned above, in this excited condition, fish tend to lose some portion of their scales and their natural slime secretions as well as to discharge bodily wastes and even to vomit the contents of their digestive tracts. All of this foreign matter in the water in a livewell poses a danger tothe fish in that the foreign matter may become lodged in the fish's gills during normal breathing. Moreover, the excited nature of the fish significantly increases its metabolism causing it to utilize oxygen from the water at a significantly increased rate. Finally, it is known that fish are relatively sensitive to the temperature of the ambient body of water and, therefore, any difference in the temperature of the water in the livewell from that of the surrounding ambient body of water, particularly when the livewell water is elevated, may exacerbate the excited condition of the fish. Conventional livewells make essentially no provision for compensating for any of these factors, other than the aforedescribed provision of water overflow and refilling of the livewell and an aeration system for replenishing oxygen to the water contained in the livewell.

In substantial contrast, the present invention provides a novel livewell apparatus and method designed to operate according to the fundamental concept of cooling the water contained in the livewell tank to a temperature sufficently reduced from the natural aquatic habitat of captured gamefish to be stored in the tank to induce a state of slowed metabolism of the gamefish. In this manner, the captive life of the fish is prolonged by effectively calming any excited tendency of the fish to reduce or even eliminate the above-described waste discharges and other foreign matter in the livewell while at the same time the cooler water is capable of retaining a greater quantity of available oxygen for the fish.

In the preferred embodiment of the present method and apparatus, a heat exchanger, preferably an auxiliary tank for containing a quantity of ice, is provided in conjunction with a circulating pump and conduit arrangement for withdrawing water from the livewell tank and transporting the withdrawn water through the heat exchanger to cool the water. A spray arrangement is associated with the circulation system for returning the cooled water into the tank to aerate the water.

Preferbly, the heat exchanger is arranged to circulate withdrawn water therethrough along an at least partially upward circulation path through the auxiliary ice tank to enchance heat transfer from the withdrawn water. A control arrangement is also provided with an adequate timing device for selectively controlling the actuation and de-actuation of the circulating pump at predetermined intervals for regulating the temperature of the water contained in the tank. The circulation system also includes a secondary bypass conduit for bypassing the heat exchanger, with a valve being associated with the bypass conduit for selectively opening and closing it to water circulating operation. A sensing device is providd for monitoring the temperature of the water contained in the livewell tank, the control arrangement being operatively associated with the sensing device and with the bypass valve for controlling the opening and closing operation of the valve in relation to the sensing device to maintain the water in the tank at a predetermined desired temperature. Preferably, the apparatus and method of the present invention are operated to maintain the water temperature in the livewell tank at a reduced temperature in the range of approximately 20-25 degrees Fahrenheit below the natural aquatic habitat of the captured gamefish, but not lower than approximately 45 degrees Fahrenheit.

DESCRIPTION OF THE PREFERRED EMBODIMENT

Figure 1:
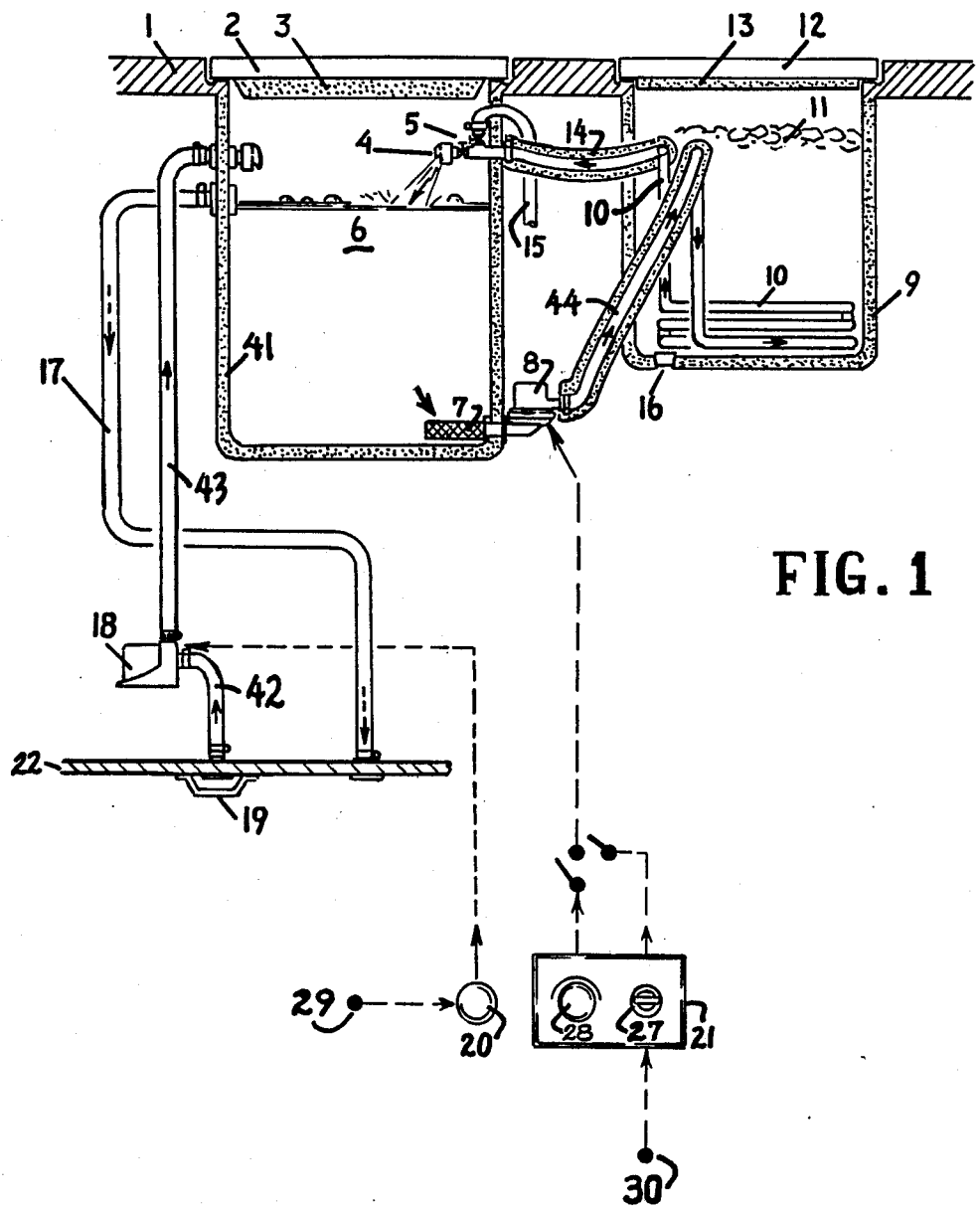
FIG. 1 is a schematic diagram of a recreational fishing boat having a livewell according to one preferred embodiment of the present invention.

Referring now to FIG. 1 of the accompanying drawings an improved livewell apparatus according to the preferred embodiment of the present invention is shown mounted within the hull of a conventional fishing-type recreational boat of the typical false-bottom type. Such boats include an outer hull 22 and an interior false bottom or deck 1 horizontally mounted within the hull at a spacing above the bottom thereof. Conventionally, fishing boats of this type have an insulated tank 41, commonly referred to as a "livewell," mounted beneath the boat deck 1 and accessible therethrough by a movable cover or lid 2 the interiorly-facing surface of which is also insulatd at 3. An auxiliary insulated storage compartment 9 is also mounted beneath the deck 1 adjacent the livewell tank 41 with a respective movable lid or cover 12 interiorly insulated at 13 providing access to the compartment 9. Typically, the storage compartment 9 is intended for use in storing refreshment and food items such as canned or bottled drinks, sandwiches and the like. A drain plug 16 is provided in the bottom of the compartment 9 for draining any water or the like that may collect in the compartment 9.

A conventional water pump 18 is mounted within the false bottom area of the boat hull 22 and communicates through an inlet conduit 42 with an inlet opening 19 in the boat hull 22, usually formed in its aft transom, and communicates through an oulet conduit 43 with the interior of the livewell tank 41 for pumping a quantity of water 6 into the livewell tank 41 from the ambient body of water in which the boat is being operated, thereby for filling the livewell tank 41 to a desired level. The pump 18 is operatively connected with a suitable electrical power supply representatively indicated at 29, such as the engine battery of conventional fishing boats, with an appropriate manually-operated switch 20 being provided for selectively actuating and de-actuating the fill pump 18. An overflow conduit 17 communicates with the interior of the livewell tank 41 in the upper region thereof and extends therefrom to and through the boat transom 22 for discharging water from the livewell tank 41 to prevent overfilling thereof above the level of the overflow conduit 17.

A circulating water pump 8 communicates through a filter 7 with the interior of the livewell tank 41 at the bottom thereof and an aeration spray head 4 is mounted within the livewell tank 41 above the level of the overflow conduit 17, the outlet of the pump 8 conventionally being connected through a suitable conduit directly with the spray head 4 for purposes of aerated circulation of the water contained inthe livewell tank 41. A discharge conduit 15 communicates with the spray head 4 through a two-way valve 5 and extends therefrom through the boat transom 22 for selectively diverting water circulated by the pump 8 to drain the livewell tank 41 when desired. A timer control device 21 is operatively connected with the circulating pump 8 for permitting manual and automatic timed regulation of the actuation and de-actuation of the circulating pump 8. The control device 21 includes an operating switch 27 having "off," "manual," and "automatic" settings and is connected with a suitable electrical power supply indicated at 30, such as the aforementioned motor battery of the boat. In the "manual" setting of the switch 27, the circulating pump 8 is operated continuously, while in the "automatic" setting the circulating pump 8 is operated intermittantly at periodic intervals between actuations as determined by an adjustable timing device set by a control dial 28.

The fishing boat and livewell apparatus as thus far described are conventional. According to the present invention, the auxiliary storage compartment 9 is modified to function as a heat exchanger when filled with a quantity of ice, indicated at 11, and the circulating aeration system of the livewell apparatus is modified to circulate water withdrawn by the circulating pump 8 through the heat exchange arrangement of the auxiliary storage compartment 9 for purposes of cooling the water prior to its aerated return to the livewell tank 41. More specifically, the auxiliary storage compartment 9 is fitted interiorly with an extended length of PVC or other suitable tubing formed in a coil or other suitable heat transfer configuration to be in heat transfer contact with the ice contained in the storage compartment 9. The tubing conduit 10 rests in the bottom of the compartment 9 with the opposite ends of the conduit 10 extending vertically to adjacent the upper region of the compartment 9 and therefrom outwardly through the compartment 9, one end of the tubing conduit 10 being connected through an insulated conduit 44 with the outlet of the circulating pump 8 and the other end of the tubing conduit 10 being connected through a similar insulated conduit 14 with the spray head 4.

In operation, water withdrawn from the livewell tank 41 through the circulating pump 8 is diverted through the insulated conduit 44 into the heat exchange tubing 10 within the auxiliary storage compartment 9 and therefrom through the insulated conduit 14 to the spray head 4 for return to the livewell tank 41. The heat exchange conduit 10 is completely submerged within the quantity of ice 11 in substantially complete and continuous heat transfer contact therewith so that, as the water withdrawn from the livewell tank 41 is circulated through the heat exchange conduit 10, the water is progressively cooled, the vertical exhaust leg 10' of the conduit 10 serving to enhance this heat transfer effect by presenting some resistance to upward water flow therethrough to improve the head pressure on the circulating pump 8 and to produce a degree of water backflow within the heat exchange conduit 10. In accordance with the present invention, the modified heat exchange circulation system above described is operated to cool the water in the livewell tank 41 to, and maintain the water at, a temperature sufficiently reduced from the natural aquatic habitat of the surrounding body of water in which the boat is being operated and from which gamefish are captured to induce a state of slowed metabolism of the gamefish. Optimally, it is believed that the water temperature in the livewell tank 41 should be reduced in the range of approximately 20–25 degrees Fahrenheit below the surface temperature of the surrounding body of water, but in no event to be less than approximately 45 degrees Fahrenheit. In this manner, the water temperature in the livewell tank 41 represents a sufficiently reduced temperature in relation to the surrounding body of water for the intended purposes of slowing the metabolism of stored fish without producing such a drastic temperature reduction as to possibly inflict a state of shock on the stored fish. In order to reach and maintain the desired temperature level, the operator may actuate and deactuate the circulating pump 8 manually through intermittent switching of the operating switch 27 between its "off" and "manual" settings. Alternatively, the operator may set the operating switch 27 in its "automatic" mode and appropriately adjust the timing device through its control dial 28 to obtain a regular periodic actuation and de-actuation of the circulating pump 8 at a selected interval sufficient to maintain the water temperture in the livewell tank 41 within the aforementioned range.

This improved cooling circulation system has been found to provide remarkably improved results over conventional livewell systems in substantially prolonging the captive life of gamefish stored in the livewell tank 41. In contrast to conventional livewell systems wherein gamefish can be typically kept alive for only one to three hours, the livewell apparatus and its method of operation according to the present invention have been found to reliably maintain captured fish alive for up to twelve to sixteen hours. While the precise reasons for this significant improvement have not been scientifically determined, it is believed that the marked reduction in water temperature in the livewell tank 41 in relation to the natural habitat of captured fish serves to slow the metabolism of fish and thereby induce a state of near dormancy of captured fish almost immediately following their placement into the livewell tank 41, much like the change in fish metabolism and activity known to occur in the winter months. As a result, the cooler water temperature essentially tranquilizes the fish to either dull or soothe any tendency to excitment and, in turn, the fish are relatively inactive while in the livewell tank 41 so that they experience only minimal scale and slime loss and minimal waste discharge and vomiting. In addition, the cooler water is more capable of holding a greater quantity of available oxygen for the fish while at the same time the slower metabolism of the fish causes them to utilize the available oxygen at a slower rate, the aeration of the water produced by the spray head 4 being more than sufficient to replenish the oxygen consumed by the fish. Accordingly, as a net result, captured fish are considerably less likely to die while stored in the livewell tank 41 in contrast to storage in a conventional livewell tank and, therefore, the captive life of the fish is substantially prolonged. As an added advantage, the resultant reduction by the present invention in the scale, slime and waste discharges by the fish in the livewell tank 41 serves to maintain the water therein considerably cleaner and freer of debris than in conventional livewells so that less occasional water overflowing and refilling of the livewell tank 41 is necessary to remove such foreign matter and, in turn, the efficiency of the cooling system is enhanced.

Figure 2:
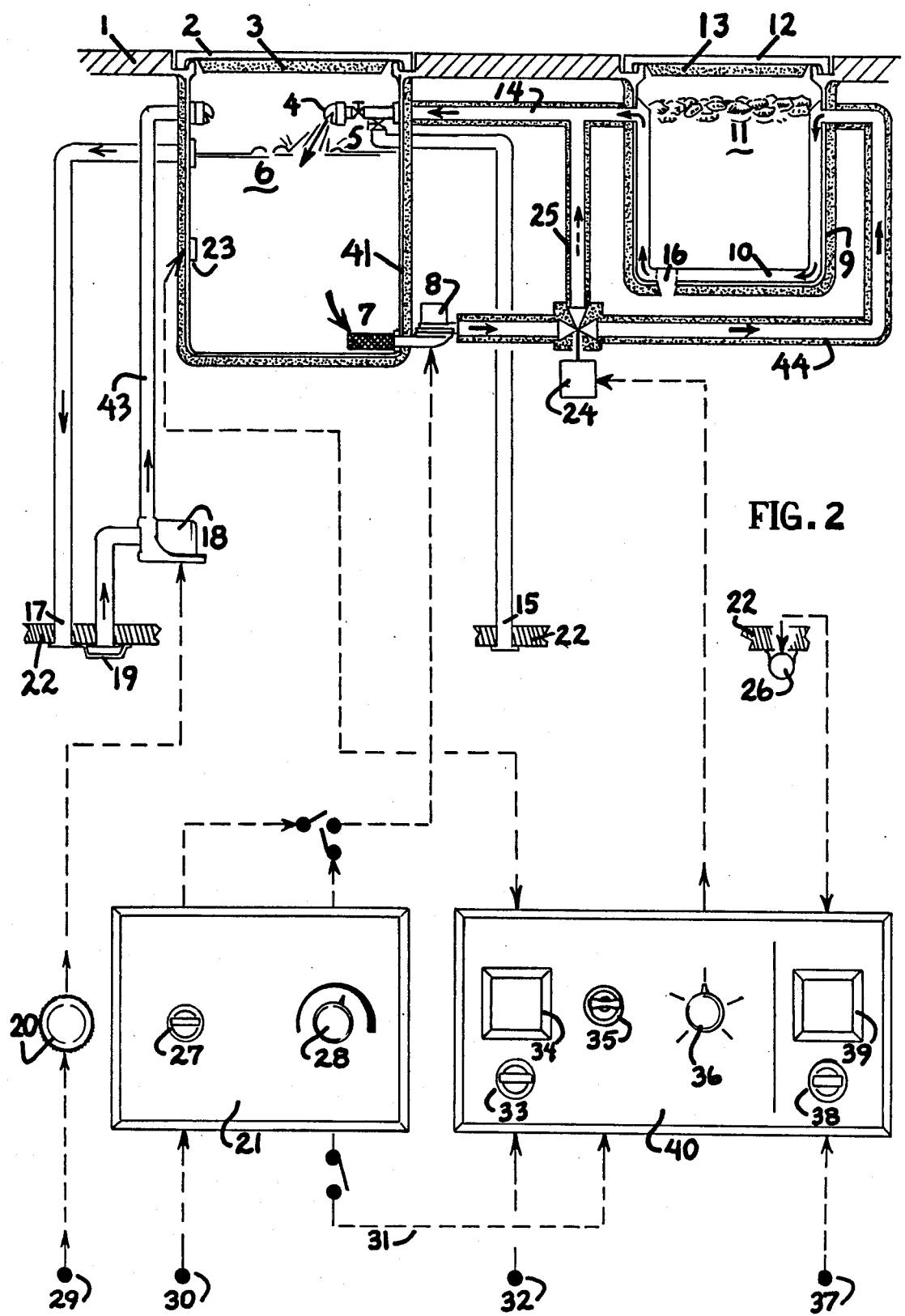
FIG. 2 is another schematic diagram similar to FIG. 1 showing a fishing boat with a livewell according to a second preferred embodiment of the present invention.

Referring now to FIG. 2, a modified embodiment of the improved livewell apparatus of FIG. 1 is shown, with like reference numerals being applied to the corresponding components of FIG. 1 described above. Basically, the livewell apparatus of FIG. 2 differs from that of FIG. 1, first, in the provision of an annular jacket formed interiorly about the walls of the auxiliary storage compartment 9 as the heat exchange conduit 10 and, second, in the provision of an insulated bypass conduit 25 communicating between the inlet and outlet conduits 44,14 to the heat exchange jacket 10 with a thermostatically and manually controllable solenoid valve 24 positioned at the juncture between the inlet conduit 44 and the bypass conduit 25 for controlling the direction of circulation of water withdrawn by the circulating pump 8 from the livewell tank 41.

The control of the solenoid valve 24 is provided by a control module 40 operatively connected through a switch line 31 with the circulation pump control device 21 to be enabled for operation of the valve 24 whenever the operating switch 27 for the circulating pump 8 is in either its "manual" or "automatic" mode. The control module 40 is also operatively connected with a temperature sensing device 23 mounted interiorly within the livewell tank 41 to monitor the temperature of the water 6 contained in the livewell tank 41 and to display the prevailing temperature on a digital liquid crystal display 34 operated by a respective electrical power source indicated at 32, such as the boat motor battery, through a respective on-off operation switch 33. The control module 40 also includes a conventional thermostat operated by a control switch 35 for setting a predetermined desired "set point" temperature for the water in the livewell tank 41 through a manually-settable calibrated temperature dial 36. The operating switch 35 for the thermostat is provided with "off," "manual," and "automatic" settings. In the "off" mode of the switch 35, the solenoid valve 24 remains in a normal open operating position for permitting circulating water flow through the inlet conduit 44 into and through the heat exchange jacket 10 while preventing diverted waterflow through the bypass conduit 25. On the other hand, in the "manual" mode of the thermostat switch 35, the solenoid valve 24 is actuated to a bypass position to close the downstream section of the inlet conduit 44 while opening the bypass conduit 25 to divert circulated water withdrawn by the pump 8 from the livewell tank 41 through the bypass conduit 25 to thereby bypass the heat exchange jacket 10. In the "automatic" mode of the thermostat switch 35, the operation of the solenoid valve 24 between its normally open and bypass positions is carried out automatically in relation to the sensed temperature of the water in the livewell tank 41 detected by the temperature sensor 23 and the set point temperature established by the position of the dial 36 to position the solenoid valve 24 in its normally open position when ever the detected temperature in the livewell tank 41 is greater than the set point temperature determined by the dial 36 while actuating the solenoid valve 24 to its bypass position whenever the detected water temperature in the livewell tank 41 is less than the set point temperature designated by the dial 36. As an added feature of the control module 40, a digital liquid crystal display 39 is provided in operative association with a temperature sensor 26 mounted on the boat transom 22 for operation by a suitable electrical power source indicated at 37, such as the boat motor battery, through an actuating on-off switch 38 for displaying the surface temperature of the surrounding body of water in which the boat is being operated.

As will be understood, the control modules 21,40 of the livewell apparatus of FIG. 2 provide enhanced preciseness in the control of the aeration and water temperature of the livewell tank 41. Through the use of the surface water temperature display 39, the operator can precisely adjust the dial 36 to establish the precise desired set point temperature for the water in the livewell tank 41 in accordance with the aforedescribed optimum temperature parameters established by the present invention. In the "automatic" modes of the circulation pump switch 27 and the thermostat switch 35, the circulation pump 8 will be actuated at desired intervals to maintain sufficient water circulation for proper cooling and aeration of the water in the livewell tank 41 while, at the same time, the thermostat of the control module 40 continuously actuates the solenoid valve 24 between its normal and bypass positions to control the circulation of the water either through the heat exchange jacket 10 or through the bypass conduit 25 to closely regulate and maintain the temperature of the water 6 in the livewell tank 41 at the set point temperature determined by the dial 36. The temperature display 34 enables the operator to check the proper operation of the system by comparing the prevailing sensed temperature of the water in the livewell tank 41 with the set point temperature determined by the dial 36. Alternatively, either or both of the circulation pump 8 and the solenoid valve 24 may be manually controlled through their respective control switches 27,35.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. For example, it is contemplated that other forms of heat exchangers and other means of cooling the water in the livewell tank, e.g. thermonic chips, a refrigeration unit, etc., may be utilized consistently with the present invention instead of the provision of a quantity of ice in an auxiliary storage compartment. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements,the present invention being limited only by the claims appended hereto and the equivalents thereof.

I claim:

1. Apparatus for temporary captive storage of live gamefish and like aquatic animals, said apparatus being particularly adapted for use by fishermen to maintain captured gamefish alive for relatively prolonged periods of time, said apparatus comprising a tank for containing a quantity of water for storage therein of captured gamefish, means for cooling the water contained in said tank, said cooling means including heat exchange means for cooling of water circulated therethrough and means for circulating water contained in said tank through said heat exchange means, and means for controlling said cooling means for maintaining the contained water at a temperature sufficiently reduced from the natural aquatic habitat of the captured gamefish to inhibit their activity and prolong their captive life, said control means including means for selectively controlling intermittent actuating and de-actuating of said circulating means at a predetermined interval period between actuations thereof for regulating the temperature of the water contained in said tank.

2. Apparatus for temporary captive storage of live gamefish and like aquatic animals according to claim 1 and characterized further in that said circulating means includes means for selectively bypassing said heat exchange means for regulating the temperature of the water contained in said tank.

3. Apparatus for temporary captive storage of live gamefish and like aquatic animals according to claim 2 and characterized further by means for sensing the temperature of the water contained in said tank and control means operatively associated with said sensing means and said bypassing means for controlling actuation and de-actuation of said bypassing means in relation to said sensing means for maintaining the water in said tank at a predetermined desired temperature.

4. Apparatus for temporary captive storage of live gamefish and like aquatic animals according to claim 1 and characterized further in that said circulating means includes means for selectively bypassing said heat exchange means for regulating the temperature of the water contained in said tank.

5. Apparatus for temporary captive storage of live gamefish and like aquatic animals according to claim 4 and characterized further by means for sensing the temperature of the water contained in said tank and control means operatively associated with said sensing means and said bypassing means for controlling actuation and de-actuation of said bypassing means in relation to said sensing means for maintaining the water in said tank at a predetermined desired temperature.

6. Apparatus for temporary captive storage of live gamefish and like aquatic animals according to claim 1 and characterized further in that said controlling means is arranged for establishing said sufficiently reduced temperature in the range of approximately 20° F. to 25° F. below the natural aquatic habitat of the captured gamefish but not lower than approximately 45° F.

7. Apparatus for temporary captive storage of live gamefish and like aquatic anmals to claim 5 and charaterized further in that said controlling means is arranged for establishing said sufficiently reduced temperature in the range of approximately 20° F. to 25° F. below the natural aquatic habitat of the captured gamefish but not lower than approximately 45° F.

8. In a recreational boat or like watercraft of the type having a "livewell" tank for containing a quantity of water for temporary captive storage therein of live gamefish and like aquatic animals, apparatus for maintaining captured gamefish alive in said tank for relatively prolonged periods of time, said apparatus comprising heat exchange means for cooling of water circulated therethrough, conduit means extending between said tank and said heat exchange means for circulation therebetween of the water contained in said tank, pump means associated with said conduit means for withdrawing water contained in said tank and transporting the withdrawn water through said heat exchange means to cool the withdrawn water, spray means associated with said conduit means for returning the cooled withdrawn water into the tank to aerate the water, and means for controlling said heat exchange means and said pump means for cooling and maintaining the water contained in said tank at a temperature sufficiently reduced from the natural aquatic habitat of the captured gamefish to induce a generally dormant state of substantially slowed metabolism of the gamefish to inhibit their activity and prolong their captive life, said controlling means including adjustable timing means for selectively controlling intermittent actuating and de-actuating of said pump means at a predetermined interval period between actuations thereof for regulating the temperature of the water contained in said tank.

9. Apparatus in a recreational boat or like watercraft according to claim 8 and characterized further in that said heat exchange means includes an auxiliary insulated tank for containing a quantity of ice and second conduit means within said auxiliary tank for transfer contact with the ice contained therein and operatively connected in fluid communication with said first-mentioned conduit means for circulating the withdrawn water through said tank for cooling of the water by the ice.

10. Apparatus in a recreational boat or like watercraft according to claim 9 and characterized further in that said second conduit means is arranged to circulate the withdrawn water along an at least partially upward circulation path through said auxiliary tank to enhance heat transfer from the withdrawn water.

11. Apparatus in a recreational boat or like watercraft according to claim 8 and characterized further in that said conduit means includes secondary conduit means for bypassing said heat exchange means and valve means associated with said secondary conduit means for selectively opening and closing it to water circulating operation for regulating the temperature of the water contained in the tank.

12. Apparatus in a recreational boat or like watercraft according to claim 11 and characterized further by means for sensing the temperature of the water contained in said tank and control means operatively associated with said sensing means and said valve means for controlling opening and closing operation of said valve means in relation to said sensing means for maintaining the water in said tank at a predetermined desired temperature.

13. Apparatus in a recreational boat or like watercraft according to claim 8 and characterized further in that said controlling means is arranged for establishing said sufficiently reduced temperature in the range of approximately 20° F. to 25° F. below the natural aquatic habitat of the captured gamefish but not lower than approximately 45° F.

14. Apparatus in a recreational boat or like watercraft according to claim 8 and characterized further in that said conduit means includes secondary conduit means for bypassing said heat exchange means and valve means associated with said secondary conduit means for selectively opening and closing it to water circulating operation for regulating the temperature of the water contained in the tank.

15. Apparatus in a recreational boat or like watercraft according to claim 14 and characterized further by means for sensing the temperature of the water contained in said tank, said control means being operatively associated with said sensing means and said valve means for controlling opening and closing operation of said valve means in relation to said sensing means for maintaining the water in said tank at a predetermined desired temperature.

16. Apparatus in a recreational boat or like watercraft according to claim 15 and characterized further in that said controlling means is arranged for establishing said sufficiently reduced temperature in the range of approximately 20° F. to 25° F. below the natural aquatic habitat of the captured gamefish but not lower than approximately 45° F.

17. Apparatus in a recreational boat or like watercraft according to claim 16 and characterized further in that said heat exchange means includes an auxiliary insulated tank for containing a quantity of ice and second conduit means within said auxiliary tank for heat transfer contact with the ice contained therein and operatively connected in fluid communication with said first-mentioned conduit means for circulating the withdrawn water through said tank for cooling of the water by the ice.

18. Apparatus in a recreational boat or like watercraft according to claim 17 and characterized further in that said second conduit means is arranged to circulate the withdrawn water along an at least partially upward circulation path through said auxiliary tank to enhance heat transfer from the withdrawn water.

19. A method of temporarily storing live gamefish and like aquatic animals in captivity to maintain the gamefish alive for relatively prolonged periods of time, said method comprising providing a contained quantity of water for storage therein of captured gamefish, and providing heat exchange means for cooling of water circulated therethrough, cooling the contained water by circulating the water through said heat exchange means, and controlling said cooling for maintaining said contained water at a temperature sufficiently reduced from the natural aquatic habitat of the captured gamefish to induce a generally dormant state of substantially slowed metabolism of the gamefish to inhibit their activity and prolong their captive life, said controlling including selectively performing said circlation intermittently at a predetermined interval period to regulate the temperature of the contained water.

20. A method of temporarily storing live gamefish and like aquatic animals according to claim 19 and characterized further in that said circulating includes conveying the contained water in an at least partially upward circulation path while in heat transfer relation with a quantity of ice to enhance heat transfer from the contained water.

21. A method of temporarily storing live gamefish and like aquatic animals according to claim 19 and characterized further by selectively bypassing said heat exchange means for regulating the temperature of the contained water.

22. A method of temporarily storing live gamefish and like aquatic animals according to claim 21 and charcterized further by sensing the temperature of the contained water and controlling said bypassing in relation to said temperature sensing for maintaining contained water at a predetermined desired temperature.

23. A method of temporarily storing live gamefish and like aquatic animals to claim 19 and characterized further in that said controlling said cooling establishes said sufficiently reduced temperature in the range of approximately 20° F. below the natural aquatic habitat of the captured gamefish but not lower than approximately 45° F.

24. A method of temporarily storing live gamefish and like aquatic animals according to claim 19 and characterized further by selectively bypassing said heat exchange means for regulating the temperature of the contained water.

25. A method of temporarily storing live gamefish and like aquatic animals according to claim 24 and charcterized further by sensing the temperature of the contained water and controlling said bypassing in relation to said temperature sensing for maintaining said contained water at a predetermined desired temperature.

26. A method of temporarily storing live gamefish and like aquatic animals according to claim 25 and characterized further in that said controlling said cooling establishes said sufficiently reduced temperature in the range of approximately 20° F. to 25° F. below the natural aquatic habitat of the captured gamefish but not lower than approximately 45° F.

27. Apparatus for temporary captive storage of live gamefish and like aquatic animals, said apparatus being particularly adapted for use by fishermen to maintain captured gamefish alive for relatively prolonged periods of time, said apparatus comprising a tank for containing a quantity of water for storage therein of captured gamefish, means for cooling the water contained in said tank, said cooling means including heat exchange means for cooling of water circulated therethrough and means for circulating water contained in said tank through said heat exchange means and for selectively bypassing said heat exchange means for regulating the temperature of the water contained in said tank, and means for controlling said cooling means for maintaining the contained water at a temperature sufficiently reduced from the natural aquatic habitat of the captured gamefish to induce a generally dormant state of substantially slowed metabolism of the gamefish to inhibit their activity and prolong their captive like, said controlling means including means for sensing the temperature of the water contained in said tank and control means operatively associated with said sensing means and said bypassing means for controlling actuation and de-actuation of said bypassing means in relation to said sensing means for maintaining the water in said tank at a predetermined desired temperature.

28. In a recreational boat or like watercraft of the type having a "livewell" tank for containing a quantity of water for temporary captive storage therein of live gamefish and like aquatic animals, apparatus for maintaining captured gamefish alive in said tank for relatively prolonged periods of time, said apparatus comprising heat exchange means for cooling of water circulated therethrough, conduit means extending between said tank and said heat exchange means for circulation therebetween of the water contained in said tank, pump means associated with said conduit means for withdrawing water contained in said tank and transporting the withdrawn water through said heat exchange means to cool the withdrawn water, and spray means associated with said conduit for returning the cooled withdrawn water into the tank to aerate the water, and means for controlling said heat exchange means and said pump means for cooling and maintaining the water contained in said tank at a temperature sufficiently reduced from the natural aquatic habitat of the captured gamefish to induce a generally dormant state of substantially slowed metabolism of the gamefish to inhibit their activity and prolong their captive life, said conduit means including secondary conduit means for bypassing said heat exchange means and valve means associated with said secondary conduit means for selectively opening and closing it to water circulating operation for regulating the temperature of the water contained in the tank.

29. Apparatus in a recreational boat or like watercraft according to claim 28 and characterized further by means for sensing the temperature of the water contained in said tank and said controlling means being operatively associated with said sensing means and said valve means for controlling opening and closing operation of said valve means in relation to said sensing means for maintaining the water in said tank at a predetermined desired temperature.

30. A method of temporarily storing live gamefish and like aquatic animals in captivity to maintain the gamefish alive for relatively prolonged periods of time, said method comprising providing a contained quantity of water for storage therein of captured gamefish and providing a quantity of ice, cooling the contained water by conveying the water in an at least partially upward circulation path while in heat transfer relation with said quantity of ice to enhance heat transfer from the contained water, and controlling said cooling for maintaining said contained water at a temperature sufficiently reduced from the natural aquatic habitat of the captured gamefish to induce a generally dormant state of substantially slowed metabolism of the gamefish to inhibit their activity and prolong their captive life.

* * * * *

UNITED STATES PATENT OFFICE
CERTIFICATE OF CORRECTION

Patent No. 4,748,765          Dated June 7, 1988

Inventor(s) Dennis K. Martin

It is certified that error appears in the above-identified patent and that said Letters Patent is hereby corrected as shown below:

Col. 1, line 51 delete "a" and insert — A —.
Col. 2, line 17 delete "tothe" and insert — to the —.
Col. 2, line 38 delete "sufficently" and insert — sufficiently —.
Col. 2, line 57 delete "Preferbly" and insert — Preferably —.
Col. 2, line 60 delete "enchance" and insert — enhance —.
Col. 3, line 2 delete "providd" and insert — provided —.
Col. 3, line 39 delete 'insulatd" and insert — insulated —.
Col. 3, line 53 delete "oulet" and insert — outlet —.
Col. 4, line 8 delete "inthe" and insert — in the —.
Col. 4, line 24 delete "intermittantly" and insert — intermittently —.
Col. 5, line 50 delete "excitment" and insert — excitement —
Col. 6, line 61 delete "when ever" and insert — whenever —.
Col. 8, line 10 insert before "inhibit" — induce a generally dormant state of substantially slowed metabolism of the gamefish to —.
Col. 8, line 54 delete "anmals" and insert — animals according —.
Col. 8, line 54-55 delete "charaterized" and insert — characterized —.
Col. 9, line 24 After "for" add — heat —.
Col. 10, line 45 delete "circlation" and insert — circulating —.
Col. 10, line 67 after "animals" add — according —.
Col. 11, line 12 delete "charcterized" and insert — characterized —.
Col. 11, line 42 delete "like" and insert — life —.

Signed and Sealed this

Nineteenth Day of December, 1989

Attest:

JEFFREY M. SAMUELS

Attesting Officer      Acting Commissioner of Patents and Trademarks